No. 819,032. PATENTED APR. 24, 1906.
W. P. A. MACFARLANE.
FLUID PRESSURE BRAKE.
APPLICATION FILED NOV. 4, 1905.

No. 819,032. PATENTED APR. 24, 1906.
W. P. A. MACFARLANE.
FLUID PRESSURE BRAKE.
APPLICATION FILED NOV. 4, 1905.

UNITED STATES PATENT OFFICE.

WILLIAM P. A. MACFARLANE, OF CHICAGO, ILLINOIS.

FLUID-PRESSURE BRAKE.

No. 819,032.  Specification of Letters Patent.  Patented April 24, 1906.

Application filed November 4, 1905. Serial No. 285,822.

*To all whom it may concern:*

Be it known that I, WILLIAM P. A. MACFARLANE, a citizen of the United States, residing at Chicago, Cook county, Illinois, have invented certain new and useful Improvements in Fluid-Pressure Brakes, of which the following is a specification.

My invention relates to fluid-pressure brakes of the automatic type; and the object thereof is primarily to provide means for reducing the auxiliary-reservoir pressure in the operation of restoring the train-pipe pressure for the purpose of releasing the brakes, such reduction being accomplished in the present instance by venting some of the auxiliary-reservoir pressure into the train-pipe, with the result that the train-pipe pressure is by that means augmented and the main air-drum on the locomotive thereby assisted and at the same time the degree of pressure necessary for the release of the brakes is reduced.

My invention is particularly applicable to an air-brake system in which means are provided for braking for empty and loaded car weight, in which equipment additional braking power is afforded, with the consequent result that the auxiliary reservoir and brake-cylinder equalize at a higher pressure than in the ordinary or standard type of brake system. When such equipments are employed in trains having cars with the ordinary or standard equipment, in which the cars are braked according to a certain percentage of their empty weight, usually seventy per cent. thereof, the brakes on cars having the latter equipment will be released before the brakes on those cars having the first-named equipment, due to the fact that the degree of pressure—that is, the auxiliary-reservoir pressure—which must be overcome by the restored train-pipe pressure is greater in an equipment provided with the empty and loaded car arrangement than in the other equipment. However, by the employment of my invention it becomes possible not only to augment the train-pipe pressure in the restoration of that pressure, as above stated, but also to reduce the increased or excess reservoir-pressure present in an equipment provided with the empty and loaded car arrangement, whereby uniformity in the release of all of the brakes of either equipment is obtained. In addition a speedier release of all of the brakes is obtained.

My invention involves other novel and advantageous features of construction and operation, as will be understood from the description hereinafter given.

Before entering upon a description of my invention it will be understood that such invention is applicable to any brake system of the usual automatic type and may be employed to coöperate with any triple valve operating in such type or system of brake equipment. However, for the purposes of a clear and accurate description of my invention I have chosen to illustrate the same as coöperating with a peculiar type of triple valve heretofore invented and made by many; but it will be understood that my invention is not to be limited or restricted to any type or species of the so-called "triple valve."

Figure 1:
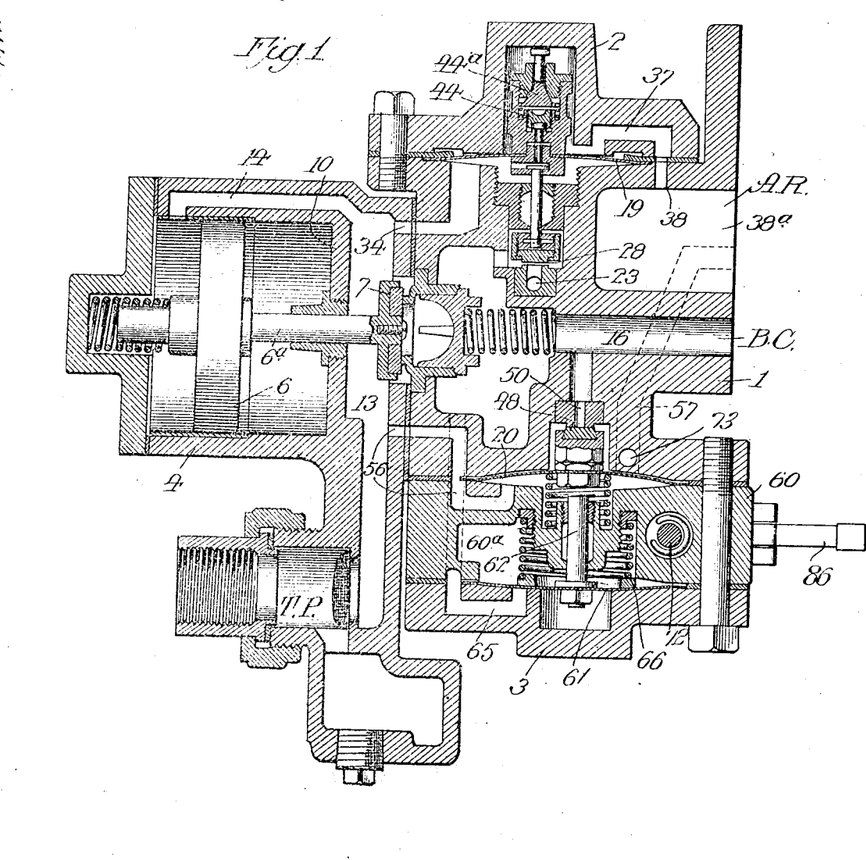
Figure 1 is a central vertical section of a so-called "triple valve," illustrating means for braking for empty and loaded car weight and to which my invention has been shown applied for the sake of a clear and definite description and understanding thereof.

Inasmuch as the particular triple valve is not essential to my invention, my triple valve as herein shown, particularly in Fig. 1, need be described only in general terms. This triple valve is of a type in which the brake-release-valve mechanism, service-valve mechanism, and emergency-valve mechanism are independent both physically and operatively. As shown, the brake-release-valve mechanism and the service-valve mechanism are contained within the main-valve body 1, while the emergency-valve mechanism is contained within a supplemental casing 4.

The brake-release-valve mechanism comprises a braking release-valve 28, operated by a movable abutment—in the present instance a diaphragm 19—and arranged to govern the release port and passage 23, which is arranged to be put into communication with the transverse passage 16 when the release-valve is open. This passage 16 communicates directly with the brake-cylinder, as indicated by the letters B C.

The service-valve mechanism comprises a service-valve 48, operated by a movable abutment—in the present instance a diaphragm 20—and governing the port and passage 50 and arranged to establish communication from the reservoir through a passage 57 to the transverse passage 16 during the application of the brakes.

The emergency-valve mechanism comprises an emergency-valve 7, normally seated at the outer end of the transverse passage 16 and arranged to govern the venting of train-pipe air from the train-pipe nozzle (marked T P) and through the passage 13. The emergency-valve is actuated by a movable abutment—in the present instance a piston 6—exposed on both sides to train-pipe pressure, with the difference that on the left-hand side, Fig. 1, of the piston the train-pipe air has free communication through passage 14 and on the right-hand side restricted communication because of leakage of air through the partition 10 and around the stem $6^a$ of the piston, with the result that the piston remains stationary in ordinary applications of the brakes—that is, service applications—but is arranged to be shifted to the left by the air-pressure on the right-hand side thereof in an emergency application of the brakes.

As herein shown, the train-pipe pressure is fed to the auxiliary reservoir through a passage 34, entering the chamber below the diaphragm 19, and thence upwardly through the diaphragm and its central stem past a check-valve 44 and feed-valve $44^a$ to the chamber in the top cap 2, from whence the pressure is conducted by passages 37 and 38 to the chamber $38^a$, which communicates with the auxiliary reservoir, as indicated by the letters A R. The diaphragm 19 is thus exposed on opposite sides to train-pipe and auxiliary-reservoir pressures, respectively, and thereby subjected to the influence of variations in train-pipe pressure. Following the path of the train-pipe air to the service-valve mechanism the train-pipe pressure feeds through a passage 56, leading from the train-pipe-air passage 13 and extending downwardly into the casing 60, hereinafter described, and thence upwardly to the under side of the diaphragm 20, with the result that this diaphragm is exposed on opposite sides to train-pipe and auxiliary-reservoir pressures, respectively, it being understood that the reservoir-pressure is conducted from the reservoir through passage 57 to the upper end of the chamber in which the diaphragm operates.

As hereinbefore stated, my invention is particularly applicable to a brake equipment provided with means for braking for empty and loaded car weight, and as the particular triple valve now being described is inherently provided with such an arrangement the same will be explained before the parts constituting my invention are described, it being understood, in the first place, that this empty and loaded car device *per se* forms no part of my present invention, and, in the second place, that such device need not necessarily be incorporated or embodied in the triple valve itself, as is herein shown.

Figure 3:
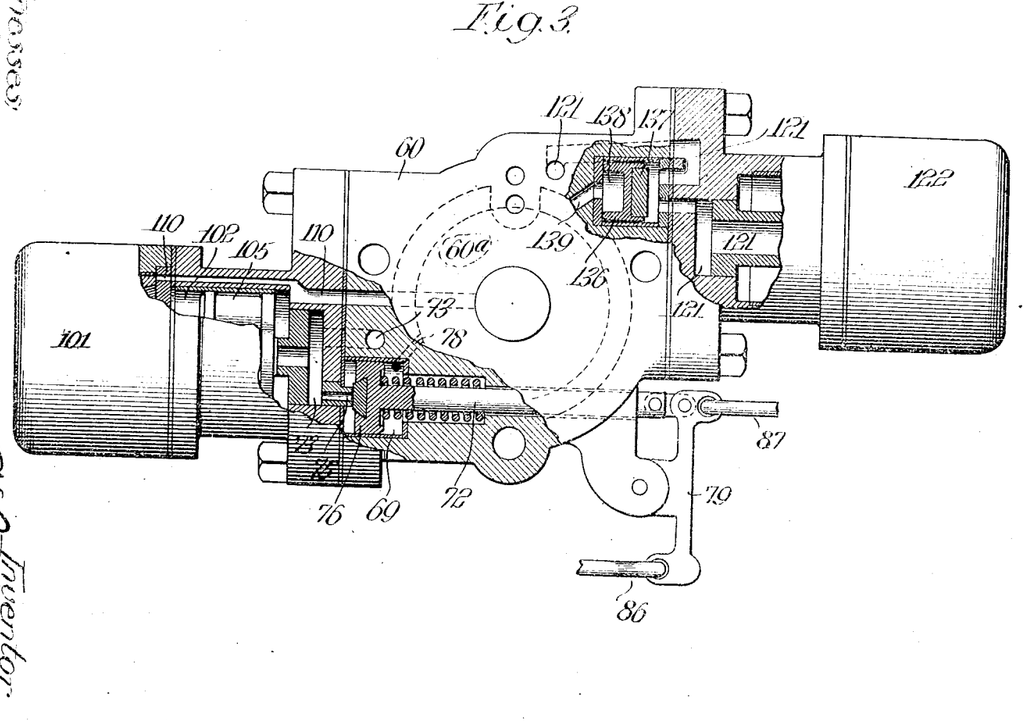
Fig. 3, a bottom plan view of the main portion or body of the triple valve with portions thereof in section to expose certain parts and passages.

As illustrated more particularly in Fig. 1, I provide at the lower end of the triple valve and between the valve-body 1 and the lower cap 3 mechanism for controlling or interfering with the service-valve and arranged to close such valve and keep it closed when the brake-cylinder pressure reaches or exceeds a predetermined amount whereby the admission of more pressure to the brake-cylinder is prevented notwithstanding further reductions of train-pipe pressure. In addition I provide means whereby such mechanism may be rendered inoperative at the will of the operator, so that full pressure may be utilized for loaded-car braking, such full or increased pressure being obtained by the employment of a reservoir supplemental to the usual auxiliary reservoir and governed by a valve device substantially as illustrated and described in Hibbard patent, No. 699,386, issued on May 6, 1902. Referring to the mechanism just mentioned, the same is arranged within the casing 60 and comprises a movable abutment—in the present instance a diaphragm 61—arranged to operate in the lower end of the chamber $60^a$ of the casing. This diaphragm carries a stem or plunger 62, arranged to be projected upwardly against the diaphragm 20 whenever the brake-cylinder pressure reaches or exceeds a predetermined amount to thereby seat the service-valve. The lower side of the diaphragm 61 is exposed to brake-cylinder pressure through the passage 65, while the upper side is normally exposed—that is, for empty-car braking—to atmospheric pressure and also exposed to the influence of a spiral spring 66, whose tension is predetermined according to the desired maximum amount of brake-cylinder pressure. To adapt the equipment for loaded-car braking, this special mechanism is arranged to be thrown out of action—that is, rendered inoperative—and in the present instance I accomplish this result by closing the communication of the chamber $60^a$ with the atmosphere and admitting reservoir-pressure in said chamber. To this end, as best illustrated in Fig. 3, I provide the casing 60 with a chamber 69, having a communication with the auxiliary-reservoir passage 57 through a branch passage 73, which communicates with a port 75. This port is governed by a valve 76 of piston type and arranged at the outer end of a manually-operable spring-pressed plunger 72. The chamber 69 is normally exposed to atmospheric pressure inasmuch as the plunger 72 is not a tight fit, and likewise the chamber $60^a$ is normally at atmospheric pressure owing to its communication with the chamber 69 by means of the cross-passage 78. The plunger is arranged to be operated from either side of the car by means of rods 86 and 87, which respectively connect it to opposite ends of a rocking lever 79, pivoted intermediate its length and connected at one of its ends with said plunger 72. When the plunger and its valve 76 are in the normal position indicated in Fig. 3, the valve device is set for empty-car braking; but whenever either one of the pull-rods 86 and 87 is operated the valve 76 is thereby opened and the auxiliary-reservoir pressure is admitted to the chamber 60ª, with the consequent result that the mechanism therein contained is rendered inoperative, so that the valve device is capable of loaded-car braking. For such latter braking I provide a pressure-reducing valve for the purpose of reducing the brake-cylinder pressure as the speed of the train slackens. This reducing-valve will be described after the construction and mode of operation of the mechanism for venting or reducing the auxiliary-reservoir pressure has been explained.

Figure 2:
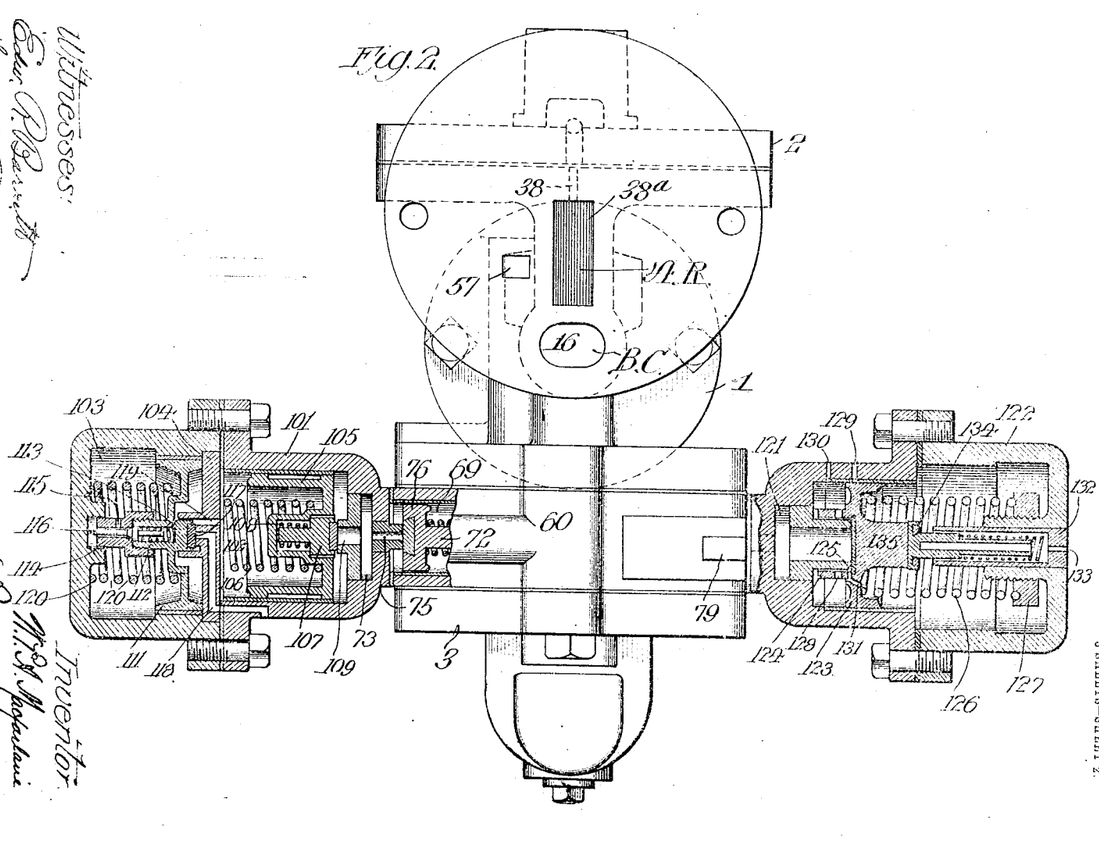
Fig. 2, an end elevation of the triple valve, with the pressure-reducing valve and also the supplemental or auxiliary valve device shown in section.

Referring to the mechanism for reducing or venting the auxiliary-reservoir pressure into the train-pipe, I have in practice and as a suitable arrangement secured or attached such mechanism to the triple-valve device itself; but it will be understood that such mechanism may be otherwise arranged without interfering with its designed purposes and functions. Referring to the construction as herein illustrated, particularly in Figs. 2 and 3, I provide a valve-casing 101, which for convenience is made in two parts or sections secured together, with the inner section secured in suitable manner to the triple valve, and particularly to the casing 60 thereof. The casing 101 is provided with an inner piston-chamber 102 and an outer piston-chamber 103, which are separated from each other by means of a partition 104. Within the inner chamber is arranged to travel a movable abutment, which in the present instance is in the form of a cup-shaped piston 105, spring-pressed inwardly by means of a spring 106. At its inner end this piston is provided with a socket which receives a valve 107, which has a movement independent of its piston and arranged to be projected therefrom and out of the socket by a light spring 108 for a purpose hereinafter made apparent. This valve 107 is arranged to govern a port and passage 109, leading from the auxiliary-reservoir passage 73, which in turn communicates with the auxiliary reservoir through the passage 57. When the valve 107 is seated, as seen in Fig. 2, the port 109 is closed; but when such valve is open in the operation of augmenting the train-pipe pressure, as hereinafter described, communication will be established directly from the auxiliary reservoir to the train-pipe, inasmuch as the inner end of the piston-chamber 102 in front of the piston communicates with the train-pipe through a passage 110, extending inwardly in the casing 60 and communicating with the chamber below the diaphragm 20, which chamber, as hereinafter explained, is in direct communication with the train-pipe through the passage 56. The result of this opening of the valve 107 is to vent the auxiliary-reservoir air to the train-pipe, and thereby reduce the auxiliary-reservoir pressure, such opening of the valve 107 being automatic upon the restoration of train-pipe pressure and upon the first increase in such pressure due to the connection of the train-pipe with the main air-drum on the locomotive, which automatic operation will be hereinafter explained. In the chamber 103 is arranged a piston 111, having a central tubular extension which is hollow in order to provide the central passage 112, which communicates through the angular passage 113 with the space or chamber in front of the piston 111. This space or chamber communicates with the passage 110 through an extension of the latter passing through the inner section of the valve-casing 101, as clearly indicated in Fig. 3. This tubular extension is provided at its outer end with a plug 114, having a central bore communicating with the passage 112 and also with a transverse bore or port 115, communicating with the piston-chamber 103 on the left-hand side of the piston 111. In this central bore is arranged a check-valve 116, governing the communication on opposite sides of the piston 111; but such check-valve, while permitting free egress of pressure from the left-hand side of the piston, does not altogether close the passage for the ingress of pressure, but nevertheless restricts such ingress. The piston 111 also acts as a valve, having a valve proper (marked 117) arranged to seat upon the partition 104 and to govern an exhaust-passage 118, leading radially through such partition and partially through the casing 101 and thence to atmosphere. This partition is also provided with a transverse passage 119, communicating with the outer end of the chamber 102, with the result that when the valve 117 is opened the pressure on the left-hand side of the piston 105 is released.

The parts being constructed as hereinafter described operate as follows: Assuming that the brake equipment is charged with air-pressure, the brakes will be applied in the usual manner upon a reduction or reductions of train-pipe pressure sufficient for service action. In this reduction of train-pipe pressure the train-pipe air on the left-hand side of the pistons 105 and 111 is permitted to flow back into the train-pipe, with the result that both sides of these pistons are exposed to the same degree of train-pipe pressure. In this connection it will be understood that the piston 105 is not a tight fit in its chamber, but permits a restricted feed of train-pipe air to its left-hand side. Thus the parts of this special mechanism remain in their normal position, (indicated in Fig. 2;) but upon the first inflow or increase of train-pipe pressure the piston 111 will be moved outwardly—that is, to the left in Fig. 2—against the tension of its spring 120, inasmuch as the feed therethrough is restricted and almost closed by the check-valve. The result of this movement of the piston is to uncover the passage 118, and thereby release the pressure on the left-hand side of the piston 105, so that the train-pipe pressure acting on the other side of the latter piston moves the same to the left against the tension of its spring 106, and thereby opens the valve 107. The opening of this valve causes a venting of the auxiliary-reservoir air direct to the train-pipe to augment the pressure therein and at the same time and as a consequence reduces the auxiliary-reservoir pressure. The pistons and their valves remain in operated or open position until the pressure in the auxiliary reservoir and the train-pipe line are substantially equalized. As a result of the reduction of the train-pipe pressure for either service or emergency application of the brakes in a system equipped with my device that part of the chamber 103 to the left, Fig. 2, of the movable abutment or piston 111 would be reduced to the same degree as the train-pipe pressure in service action or to atmospheric pressure in emergency action, (assuming that the engineer follows the rule requiring the train-pipe to be emptied in emergency action,) so that the initial restoration in the train-pipe pressure will move the piston 111 to the left and cause the uncovering or opening of the port or passage 109, leading from the auxiliary reservoir, whereby the auxiliary-reservoir pressure will be vented to the train-line. This result takes place upon a very slight increase in the train-pipe pressure and at the initial restoration of the train-pipe pressure in the operation of releasing the brakes, inasmuch as the spring 120 is of slight resistance, the tension thereof being sufficient only to return the piston 111 to seat the valve 117, and as in like manner the spring 106 is of sufficient tension only to hold the valve 107 seated upon the port 109 when the pressure on opposite sides of the piston 105 is equalized. Consequently a slight increase in the train-line pressure in the operation of releasing the brakes by restoration of such pressure is sufficient to move the piston 111 to open the exhaust port and passage 118, whereupon such train-line pressure moves the piston 105 to open the port 109 at substantially the initial period in the operation of restoring the train-pipe pressure. In this manner the reservoir-pressure is reduced and the train-pipe pressure increased, so that the train-pipe quickly responds to reservoir-pressure and the brakes are thereby quickly released. In case the particular equipment or car is provided with an empty and loaded car device the auxiliary-reservoir pressure in excess of the auxiliary-reservoir pressure of equipments or cars unprovided with such device will be vented into the train-pipe, and such venting will continue until the train-pipe and reservoir are substantially equalized, with the result that the brake on a car so equipped with the empty and loaded car device may be released as soon as or sooner than the brakes on a car not so equipped, notwithstanding the original excess of auxiliary-reservoir pressure.

The valve 107 has a movement independent of its piston 105 for the purpose of preventing the feeding of train-pipe air directly to the auxiliary reservoir through the passage 109, which might occur upon first feeding up the air-brake system from an empty condition. It will be noted that under such circumstances the pressure first admitted to the train-pipe would move the piston 105 to the left, but the valve 107 would remain seated by reason of its spring 108, there being no pressure in the reservoir to open such valve, as would be the case when the train-pipe pressure is restored for releasing the brakes.

As hereinbefore stated, the equipment now being described is provided with a pressure-reducing valve, which is illustrated particularly in Figs. 2 and 3. This valve device is also attached to the casing 60 and contains a reducing-valve governing an exhaust-passage 121, leading from the brake-cylinder through the casing 60 to such valve device. This device comprises a casing 122, which in the present instance is made in two sections, in the inner one of which operates a piston 123, having a tubular extension 124. This piston also constitutes a valve, inasmuch as its inner end is arranged to seat upon the seat 125, and thereby close the end of the passage 121. This piston is held seated by a spring 126, which by means of the adjustable collar 127 may be adjusted in tension to equal the predetermined pressure desired in the brake-cylinder. The tubular extension 124 is provided with ports 128, which when the piston 123 travels sufficiently to the right, Fig. 2, permits the flow of brake-cylinder pressure into the piston-chamber and thence to the atmosphere through the port or ports 129, which are normally closed by the piston. The piston-chamber is also provided with a small port 130, so as to keep such chamber at atmospheric pressure and to relieve the pressure therein after the piston has closed the port 129. This piston is provided with a transverse port 131 for the purpose of admitting the brake-cylinder pressure to the right-hand side of the piston when the valve is opened and to thereby eliminate the effect of the pressure area of the piston. In the outer end of the casing 122 is arranged a tube 132, having an exhaust-port 133. Within this tube slides a valve 134, arranged to seat on the inner end of such tube. Normally the chamber on the right of the piston 123 is open to atmosphere through port 133, inasmuch as the valve 134 is held away from its seat and against the stem 135 of the piston. When the piston 123 is nearly seated, the tubular extension or hood 124 on the piston closes the communication from the brake-cylinder through the passages 129, at which time the brake-cylinder air is prevented from entering the space or chamber on the left-hand side of the piston 123, Fig. 2. The pressure or air now vents through the passage 131 to the right of the piston 123, filling the chamber on such side of the piston and causing the latter to quickly close and cut off the flow of air from the brake-cylinder. However, when the piston moves outwardly, due to excess pressure in the brake-cylinder, the valve 134 is caused to seat, so as to close the exhaust-port 132 and to permit the brake-cylinder pressure entering through port 131 to be confined in the chamber, so as to counterbalance the brake-cylinder pressure on the other side of the piston. When the brake-cylinder pressure has been sufficiently reduced or blown down through the port 129, the spring 126 will reseat the valve, closing passage 121 and opening the exhaust-port 133. In emergency action and for loaded-car braking, where the brake-cylinder pressure is considerably in excess of the predetermined amount, the reducing-valve will operate successively to reduce the brake-cylinder pressure in proportion to the slackening of speed of the train.

The pressure-reducing valve or blowdown device is intended for use for empty-car braking and not for loaded-car braking, and consequently it is desirable to cut the reducing-valve out of service whenever the special mechanism for empty and loaded car braking is rendered operative. In order that this cutting out of reducing-valve may be automatic in action and be simultaneous with the act of rendering said special mechanism operative, I interpose in the passage 121 a cut-out valve which is under the control of the auxiliary-reservoir pressure admitted to the chamber $60^a$ in the manner hereinbefore described. In the present instance, as seen in Fig. 3, this cut-out valve is in the form of a piston 136, having on one face a valve 137, arranged to cover or uncover two portions of the passage 121. This piston 136 operates in a chamber 138, which is in communication with the chamber $60^a$ through a branch passage 139. For empty-car braking the valve 137 is in position to uncover the two portions of the passage 121, so as not to interfere with the action of the reducing-valve; but when the pressure is admitted to the chamber $60^a$ the valve 137 is forced to the right, Fig. 3, thereby interrupting said passage 121 and cutting the reducing-valve out of service.

By the use of my invention the brakes are released by a restoration of train-pipe pressure of less throw than usual and a quicker release of the brakes thereby obtained. Moreover, the brakes of equipments provided with empty and loaded car devices are permitted to be released synchronously with the brakes on cars or equipments unprovided with such devices. Moreover, my invention makes the auxiliary reservoir an adjunct to the locomotive-reservoir or main air-drum, inasmuch as they associate in filling the train-pipe to the releasing pressure.

While I have herein provided for a leakage of train-pipe air to the left-hand side of the piston 111 past the check-valve 116, it is evident that such leakage of air may be otherwise provided for—as, for instance, the piston 111 itself may be a loose fit in its chamber or bushing, so as to permit a proper restricted communication with the train-pipe as to the opposite sides of such piston.

I claim—

1. In a fluid-pressure brake system, the combination, with the triple valve, of means for admitting auxiliary-reservoir pressure to the train-pipe in the operation of restoring the train-pipe pressure in service applications of the brakes for augmenting the pressure therein and assisting in the release of the brakes.

2. In a fluid-pressure brake system, the combination, with the triple valve, of fluid-pressure-actuated means for admitting auxiliary-reservoir pressure to the train-pipe in the operation of restoring the train-pipe pressure in service applications of the brakes for augmenting the pressure therein and assisting in the release of the brakes.

3. In a fluid-pressure brake system, the combination, with the triple valve, of a valve governing a direct passage from the auxiliary reservoir to the train-pipe, said valve normally closing said passage and also during application of the brakes but arranged to open upon restoration of the train-pipe pressure in service applications of the brakes and to thereby admit auxiliary-reservoir pressure to the train-pipe.

4. In a fluid-pressure brake system, the combination, with the triple valve, of a fluid-pressure-actuated valve governing a direct passage from the auxiliary reservoir to the train-pipe, said valve normally closing said passage and also during application of the brakes but arranged to open upon restoration of the train-pipe pressure in service applications of the brakes and to thereby admit auxiliary-reservoir pressure to the train-pipe.

5. In a fluid-pressure brake system, the combination, with the triple valve, of a valve governing a direct passage from the auxiliary reservoir to the train-pipe, said valve normally closing said passage and also during application of the brakes but arranged to open upon restoration of the train-pipe pressure in service applications of the brakes and to thereby admit auxiliary-reservoir pressure to the train-pipe, a movable abutment controlling said valve and operated by variations in train-pipe pressure.

6. In a fluid-pressure brake system, the combination with the triple valve, of a valve governing a direct passage from the auxiliary reservoir to the train-pipe, said valve normally closing said passage and also during application of the brakes but arranged to open upon restoration of the train-pipe pressure and to thereby admit auxiliary-reservoir pressure to the train-pipe, a movable abutment controlling said valve and operated by variations in train-pipe pressure, said valve having a movement independent of its abutment.

7. In a fluid-pressure brake system, the combination, with the triple valve, of a valve governing a direct passage from the auxiliary reservoir to the train-pipe, said valve normally closing said passage and also during application of the brakes but arranged to open upon restoration of the train-pipe pressure and to thereby admit auxiliary-reservoir pressure to the train-pipe, a movable abutment controlling said valve and operated by variations in train-pipe pressure, said valve being normally held away from its abutment and toward its seat with a yielding pressure.

8. In a fluid-pressure brake system, the combination, with the triple valve, of a valve governing a direct passage from the auxiliary reservoir to the train-pipe, said valve normally closing said passage and also during application of the brakes but arranged to open upon restoration of the train-pipe pressure and to thereby admit auxiliary-reservoir pressure to the train-pipe, a movable abutment controlling said valve and exposed to train-pipe pressure directly on one side and indirectly on the other, and means for releasing such indirect pressure to permit the direct pressure to move the abutment and open the valve to thereby admit auxiliary-reservoir air direct to the train-pipe.

9. In a fluid-pressure brake system, the combination, with the triple valve, of a valve governing a direct passage from the auxiliary reservoir to the train-pipe, said valve normally closing said passage and also during application of the brakes but arranged to open upon restoration of the train-pipe pressure and to thereby admit auxiliary-reservoir pressure to the train-pipe, a movable abutment controlling said valve and exposed to train-pipe pressure directly on one side and indirectly on the other, a spring acting on said abutment and assisting the indirect pressure, and means for releasing such indirect pressure to permit the direct pressure to move the abutment and open the valve to thereby admit auxiliary-reservoir air direct to the train-pipe.

10. In a fluid-pressure brake system, the combination, with the triple valve, of a valve governing a direct passage from the auxiliary reservoir to the train-pipe, said valve normally closing said passage and also during application of the brakes but arranged to open upon restoration of the train-pipe pressure and to thereby admit auxiliary-reservoir pressure to the train-pipe, a movable abutment controlling said valve and exposed to train-pipe pressure directly on one side and indirectly on the other, and means for releasing such indirect pressure to permit the direct pressure to move the abutment and open the valve to thereby admit auxiliary-reservoir air direct to the train-pipe, comprising fluid-pressure mechanism controlling the release of said indirect pressure.

11. In a fluid-pressure brake system, the combination, with the triple valve, of a valve governing a direct passage from the auxiliary reservoir to the train-pipe, said valve normally closing said passage and also during application of the brakes but arranged to open upon restoration of the train-pipe pressure and to thereby admit auxiliary-reservoir pressure to the train-pipe, a movable abutment controlling said valve and exposed to train-pipe pressure directly on one side and indirectly on the other, and means for releasing such indirect pressure to permit the direct pressure to move the abutment and open the valve to thereby admit auxiliary-reservoir air direct to the train-pipe, comprising a second movable abutment and a valve actuated thereby to release said indirect pressure in the operation of restoring the train-pipe pressure.

12. In a fluid-pressure brake system, the combination, with the triple valve, of a valve governing a direct passage from the auxiliary reservoir to the train-pipe, said valve normally closing said passage and also during application of the brakes but arranged to open upon restoration of the train-pipe pressure and to thereby admit auxiliary-reservoir pressure to the train-pipe, a movable abutment controlling said valve and exposed to train-pipe pressure directly on one side and indirectly on the other, and means for releasing such indirect pressure to permit the direct pressure to move the abutment and open the valve to thereby admit auxiliary-reservoir air direct to the train-pipe, comprising a second movable abutment, and a valve actuated thereby to release said indirect pressure in the operation of restoring the train-pipe pressure, said second abutment being also exposed on one side to direct train-pipe pressure and on the other side to indirect train-pipe pressure.

13. In a fluid-pressure brake system, the combination, with the triple valve, of a valve governing a direct passage from the auxiliary reservoir to the train-pipe, said valve normally closing said passage and also during application of the brakes but arranged to open upon restoration of the train-pipe pressure and to thereby admit auxiliary-reservoir pressure to the train-pipe, a movable abutment controlling said valve and exposed to train-pipe pressure directly on one side and indirectly on the other, and means for releasing such indirect pressure to permit the direct pressure to move the abutment and open the valve to thereby admit auxiliary-reservoir air direct to the train-pipe, comprising a second movable abutment and a valve actuated thereby to release said indirect pressure in the operation of restoring the train-pipe pressure, said second abutment being exposed on one side to train-pipe pressure and having a check-valved passage to admit train-pipe pressure to the other side.

14. In a fluid-pressure brake system, the combination, with the triple valve, of a valve governing a direct passage from the auxiliary reservoir to the train-pipe, said valve normally closing said passage and also during application of the brakes but arranged to open upon restoration of the train-pipe pressure and to thereby admit auxiliary-reservoir pressure to the train-pipe, a movable abutment controlling said valve and exposed to train-pipe pressure directly on one side and indirectly on the other, and means for releasing such indirect pressure to permit the direct pressure to move the abutment and open the valve to thereby admit auxiliary-reservoir air direct to the train-pipe, comprising a second movable abutment and a valve actuated thereby to release said indirect pressure in the operation of restoring the train-pipe pressure, said second abutment being exposed on one side to train-pipe pressure and having a passage to admit train-pipe pressure to its other side, and means in said passage for permitting free retrogression of pressure from said other side but restricting the passage of pressure thereto.

15. In a fluid-pressure brake system, the combination, with the triple valve having service and emergency mechanisms, of means independent of such mechanisms for admitting auxiliary-reservoir pressure to the train-pipe in the operation of restoring the train-pipe pressure for augmenting the pressure therein and assisting in the release of the brakes, said means comprising an abutment movable in a chamber having on one side free communication and on the other side restricted communication with the train-pipe, and a valve controlled by said abutment and governing a passage from the auxiliary reservoir to the train-pipe.

16. In a fluid-pressure brake system, the combination, with the triple valve having service and emergency mechanisms, of means independent of such mechanisms for admitting auxiliary-reservoir pressure to the train-pipe in the operation of restoring the train-pipe pressure for augmenting the pressure therein and assisting in the release of the brakes, said means comprising a piston-chamber communicating with the train-pipe, a piston fitting loosely therein to permit restricted flow of pressure from one side to the other, and a valve controlled by said piston and governing a passage from the auxiliary reservoir to the train-pipe.

17. In a fluid-pressure brake system, the combination, with the triple valve, of means for admitting auxiliary-reservoir pressure to the train-pipe in the operation of restoring the train-pipe pressure for augmenting the pressure therein and assisting in the release of the brakes, said means comprising a piston operated by the operation of restoration of train-pipe pressure and provided with a socket, and a valve arranged in said socket and adapted to govern a passage from the auxiliary reservoir to the train-pipe.

18. In a fluid-pressure brake system, the combination, with the triple valve, of means for admitting auxiliary-reservoir pressure to the train-pipe in the operation of restoring the train-pipe pressure for augmenting the pressure therein and assisting in the release of the brakes, said means comprising a piston operated by the operation of restoration of train-pipe pressure and provided with a socket, and a valve arranged in said socket and adapted to govern a passage from the auxiliary reservoir to the train-pipe, said valve having a movement independent of its piston and tending to be projected therefrom with a yielding pressure.

19. In a fluid-pressure brake system, the combination, with the triple valve, of means for admitting auxiliary-reservoir pressure to the train-pipe in the operation of restoring the train-pipe pressure for augmenting the pressure therein and assisting in the release of the brakes, said means comprising a piston operated by the operation of restoration of train-pipe pressure and provided with a socket, a valve arranged in said socket and adapted to govern a passage from the auxiliary reservoir to the train-pipe, and a spring tending to hold the valve projected outwardly from its socket.

20. In a fluid-pressure brake system, the combination, with the triple valve, of means for closing the service-valve when the brake-cylinder pressure exceeds a predetermined amount, and means for admitting auxiliary-reservoir pressure to the train-pipe in the operation of restoring the train-pipe pressure to release the brakes.

21. In a fluid-pressure brake system, the combination, with the triple valve, of means for closing the service-valve when the brake-cylinder pressure exceeds a predetermined amount, and means connected and coöperating with the triple valve and arranged to control a direct passage from the auxiliary reservoir to the train-pipe and to admit auxiliary-reservoir pressure to the train-pipe in the operation of restoring the brakes.

22. In a fluid-pressure brake system, the combination, with the triple valve, of means for closing the service-valve when the brake-cylinder pressure exceeds a predetermined amount, and means for admitting auxiliary-reservoir pressure to the train-pipe in the operation of restoring the train-pipe pressure to release the brakes, both of said means being under the control of variations in train-pipe pressure.

23. In a fluid-pressure brake system, the combination, with the triple valve, of a movable abutment under the control of the brake-cylinder pressure for closing the service-valve when the brake-cylinder pressure exceeds a predetermined amount, and means coöperating with the triple valve for admitting auxiliary-reservoir pressure to the train-pipe in the operation of restoring the train-pipe pressure to release the brakes.

24. In a fluid-pressure brake system, the combination, with the triple valve, of mechanism for holding the service-valve closed when the brake-cylinder exceeds a predetermined amount, means for rendering said mechanism inoperative, and a pressure-reducing valve coöperating with the brake-cylinder and controlled in action by said mechanism, such valve being operative or inoperative accordingly as the said mechanism is operative or inoperative.

25. In a fluid-pressure brake system, the combination, with the triple valve, of mechanism for holding the service-valve closed when the brake-cylinder exceeds a predetermined amount, means for rendering said mechanism inoperative, a pressure-reducing valve coöperating with the brake-cylinder, and means for rendering said mechanism inoperative and by that act cutting the reducing-valve out of service.

26. In a fluid-pressure brake system, the combination, with the triple valve, of mechanism for holding the service-valve closed when the brake-cylinder exceeds a predetermined amount, means for rendering said mechanism inoperative, a pressure-reducing valve coöperating with the brake-cylinder, said mechanism comprising an abutment exposed on one side to brake-cylinder pressure and on the other side to atmospheric pressure for empty-car braking, and means for admitting pressure to that side of the abutment thus exposed to atmospheric pressure and by that act cutting the reducing-valve out of service.

27. In a fluid-pressure brake system, the combination, with the triple valve, of mechanism for holding the service-valve closed when the brake-cylinder exceeds a predetermined amount, means for rendering said mechanism inoperative, a pressure-reducing valve coöperating with the brake-cylinder, said mechanism comprising an abutment exposed on one side to brake-cylinder pressure and on the other side to atmospheric pressure for empty-car braking, and means for admitting reservoir-pressure to that side of the abutment thus exposed to atmospheric pressure and by that act cutting the reducing-valve out of service.

28. In a fluid-pressure brake system, the combination, with the triple valve, of mechanism for holding the service-valve closed when the brake-cylinder exceeds a predetermined amount, means for rendering said mechanism inoperative, a pressure-reducing valve coöperating with the brake-cylinder, said mechanism comprising an abutment exposed on one side to brake-cylinder pressure and on the other side to atmospheric pressure for empty-car braking, a valve controlling a passage from the brake-cylinder to the pressure-reducing valve, and means for admitting reservoir-pressure to that side of the abutment thus exposed to atmospheric pressure and by that act closing said controlling-valve to thereby cut the reducing-valve out of service.

29. In a fluid-pressure brake system, the combination, with the triple valve, of mechanism for holding the service-valve closed when the brake-cylinder exceeds a predetermined amount, means for rendering said mechanism inoperative, a pressure-reducing valve coöperating with the brake-cylinder, said mechanism comprising an abutment exposed on one side to brake-cylinder pressure and on the other side to atmospheric pressure for empty-car braking, a valve controlling a passage from the brake-cylinder to the pressure-reducing valve and open when said mechanism is in condition for empty-car braking, and means for admitting pressure to that side of the abutment thus exposed to atmospheric pressure and by that act closing said controlling-valve to thereby cut the reducing-valve out of service.

30. In a fluid-pressure brake system, the combination, with the triple valve, of mechanism for holding the service-valve closed when the brake-cylinder exceeds a predetermined amount, means for rendering said mechanism inoperative, a pressure-reducing valve coöperating with the brake-cylinder, said mechanism comprising an abutment exposed on one side to brake-cylinder pressure and on the other side to atmospheric pressure for empty-car braking, a valve controlling a passage from the brake-cylinder to the pressure-reducing valve and open when said mechanism is in condition for empty-car braking, fluid-pressure-actuated mechanism for actuating said controlling-valve, and means for admitting pressure to that side of the abutment exposed to atmospheric pressure and also to said fluid-pressure-actuated mechanism to close the controlling-valve.

31. In a fluid-pressure brake system, the combination, with the triple valve, of mechanism for holding the service-valve closed when the brake-cylinder exceeds a predetermined amount, means for rendering said mechanism inoperative, a pressure-reducing valve coöperating with the brake-cylinder, said mechanism comprising an abutment exposed on one side to brake-cylinder pressure and on the other side to atmospheric pressure for empty-car braking, a valve controlling a passage from the brake-cylinder to the reducing-valve and having an operating-piston, and means for equalizing the pressure on opposite sides of the abutment and admitting pressure against said piston, whereby both said mechanism and the reducing-valve are rendered inoperative to permit of loaded-car braking.

32. In combination with a triple valve and a device for braking cars according to weight empty or loaded, a pressure-reducing valve for reducing the brake-cylinder pressure and means for governing communication between the brake-cylinder and the reducing-valve.

33. In combination with a triple valve and a device for braking cars according to weight empty or loaded, a pressure-reducing valve for reducing the brake-cylinder pressure and fluid-pressure-actuated means for governing communication between the brake-cylinder and the reducing-valve.

34. In combination with a triple valve and a device for braking cars according to weight empty or loaded, a pressure-reducing valve for reducing the brake-cylinder pressure and means for cutting said valve out of action for loaded-car braking.

35. In combination with a triple valve and a device for braking cars according to weight empty or loaded, a pressure-reducing valve for reducing the brake-cylinder pressure, and controlling means for closing the feed of auxiliary-reservoir pressure to the brake-cylinder when the brake-cylinder pressure exceeds a predetermined amount.

36. In combination with a triple valve and a device for braking cars according to weight empty or loaded, a pressure-reducing valve for reducing the brake-cylinder pressure, controlling mechanism for closing the feed of auxiliary-reservoir pressure to the brake-cylinder when the brake-cylinder pressure exceeds a predetermined amount, and means for cutting out of action said pressure-reducing valve and said mechanism when braking loaded cars.

37. In a device for braking cars a valve device auxiliary to a triple valve and arranged to vent the auxiliary-reservoir pressure to the train-pipe when releasing the brakes after a service application thereof.

38. A device for reducing brake-cylinder pressure comprising a movable abutment exposed on one side to brake-cylinder pressure and carrying a valve proper normally closing the exhaust from the brake-cylinder, and means for admitting brake-cylinder pressure to the other side of said abutment for equalizing the air-pressure on opposite sides of the abutment after the same moves to open the valve.

39. A device for reducing brake-cylinder pressure comprising a movable abutment exposed on one side to brake-cylinder pressure and carrying a valve proper normally closing the exhaust from the brake-cylinder, said abutment having a passage communicating between its opposite pressure areas and opened to brake-cylinder pressure when the valve is opened.

40. A device for reducing brake-cylinder pressure comprising a movable abutment exposed on one side to brake-cylinder pressure and carrying a valve proper normally closing the exhaust from the brake-cylinder, a chamber in which the abutment operates and which is provided with an exhaust-port, an exhaust-valve governing such port and arranged to close the same when abutment operates to open the valve, and means for admitting brake-cylinder pressure to that side of the valve normally exposed to atmospheric pressure through said port.

41. In a fluid-pressure brake system, the combination, with the triple valve, of means controlled by variations in train-pipe pressure for admitting auxiliary-reservoir pressure to the train-pipe in the operation of restoring the train-pipe pressure in service applications of the brakes for augmenting the pressure therein and assisting in the release of the brakes.

42. In a fluid-pressure brake system, the combination, with the triple valve, of a valve controlled wholly by variations in train-pipe pressure and governing a direct passage from the auxiliary reservoir to the train-pipe, said valve normally closing said passage and also during application of the brakes but arranged to open upon restoration of the train-pipe pressure to thereby admit auxiliary-reservoir pressure to the train-pipe.

43. In a device for braking cars, a valve auxiliary to a triple valve and arranged to vent the auxiliary-reservoir pressure to the train-pipe in the operation of restoring the train-pipe pressure in either the service or emergency applications of the brakes.

44. In a fluid-pressure brake system, the combination, with the triple valve, of means for admitting auxiliary-reservoir pressure to the train-pipe in the operation of restoring the train-pipe pressure in either the service or emergency applications of the brakes.

45. In a fluid-pressure brake system, the combination, with the triple valve, of means for admitting auxiliary-reservoir pressure to the train-pipe upon the initial restoration of the train-pipe pressure in the operation of releasing the brakes.

46. In a fluid-pressure brake system, the combination, with the triple valve, of a direct passage from the auxiliary reservoir to the train-pipe, and means coöperating with such passage for admitting the auxiliary-reservoir pressure to the train-pipe upon the initial restoration of the train-pipe pressure in the operation of releasing the brakes.

47. A device for reducing brake-cylinder pressure comprising a movable abutment exposed on one side to brake-cylinder pressure and carrying a valve proper normally closing the exhaust from the brake-cylinder, and means for equalizing the air-pressure on opposite sides of the abutment after the same moves to open the valve, and cutting off the pressure from the brake-cylinder side of the abutment as the valve seats, thereby venting the pressure to the opposite side of the abutment until the valve is fully seated.

48. A device for reducing brake-cylinder pressure comprising a movable abutment exposed on one side to brake-cylinder pressure and carrying a valve proper normally closing the exhaust from the brake-cylinder, said abutment being normally exposed on its other side to atmospheric pressure, and means for equalizing the air-pressure on opposite sides of the abutment after the same moves to open the valve.

49. A device for reducing brake-cylinder pressure comprising a movable abutment operating in the chamber and exposed on one side to brake-cylinder pressure and carrying a valve proper normally closing the exhaust from the brake-cylinder, said abutment being normally exposed on its other side to atmospheric pressure through a normally open passage in said chamber, means for closing said passage upon the opening movement of the valve, and means for equalizing the air-pressure on opposite sides of the abutment after the same moves to open the valve.

50. A device for reducing brake-cylinder pressure comprising a movable abutment operating in the chamber and exposed on one side to brake-cylinder pressure and carrying a valve proper normally closing the exhaust from the brake-cylinder, said abutment being normally exposed on its other side to atmospheric pressure through a normally open passage in said chamber, means for closing said passage upon the opening movement of the valve, and means for equalizing the air-pressure on opposite sides of the abutment after the same moves to open the valve, consisting of a passage through the abutment and forming a communication between its opposite sides.

51. A device for reducing brake-cylinder pressure comprising a piston 123 provided with a tubular extension 124 and having at the inner end of said extension a valve proper normally closing the exhaust from the brake-cylinder, said abutment being exposed on one side at the valve proper to brake-cylinder pressure and exposed as to the remainder of said side to atmospheric pressure and normally exposed on its other side to atmospheric pressure, and means for equalizing the air-pressure on opposite sides of the abutment after the same moves to open the valve.

52. A device for reducing brake-cylinder pressure comprising a piston 123 movable in a chamber communicating by a passage with the brake-cylinder and having a central tubular extension forming a valve normally closing said brake-cylinder passage, said piston having on its valve side an annular pressure area normally exposed to atmospheric pressure, the other side of the piston being normally exposed to atmospheric pressure, and means for equalizing the air-pressure on opposite sides of the abutment after the latter moves to open the valve.

53. In a fluid-pressure brake system, the combination, with the triple valve, of means operating independent of the auxiliary-reservoir pressure for admitting such pressure to the train-pipe upon the initial restoration of the train-pipe pressure in the operation of releasing the brakes.

54. In a fluid-pressure brake system, the combination, with a triple valve having service and emergency mechanisms, of means independent of said mechanisms for admitting auxiliary-reservoir pressure to the train-pipe.

WILLIAM P. A. MACFARLANE.

Witnesses:
S. E. HIBBEN,
LOUIS B. ERWIN.